(12) United States Patent
Waite et al.

(10) Patent No.: US 9,228,243 B2
(45) Date of Patent: Jan. 5, 2016

(54) SYSTEM AND METHOD FOR CONDITIONING A HARDWOOD PULP LIQUID HYDROLYSATE

(75) Inventors: Darrell M. Waite, Bangor, ME (US); Richard Arnold, Milford, ME (US); James St. Pierre, Milford, ME (US); Hemant P. Pendse, Orono, ME (US); William H. Ceckler, Hancock, ME (US); Amy Elizabeth Luce, Brewer, ME (US); Rino P. Dumont, Hermon, ME (US)

(73) Assignees: Red Shield Acquistion, LLC, Old Town, ME (US); University of Maine System of Board of Trustees, Bangor, ME (US)

( * ) Notice: Subject to any disclaimer, the term of this patent is extended or adjusted under 35 U.S.C. 154(b) by 100 days.

(21) Appl. No.: 13/592,689

(22) Filed: Aug. 23, 2012

(65) Prior Publication Data

US 2013/0220815 A1 Aug. 29, 2013

Related U.S. Application Data

(60) Provisional application No. 61/526,895, filed on Aug. 24, 2011.

(51) Int. Cl.
| | |
|---|---|
| *C13K 13/00* | (2006.01) |
| *C13K 1/02* | (2006.01) |
| *C08H 8/00* | (2010.01) |
| *C08H 7/00* | (2011.01) |
| *D21C 11/00* | (2006.01) |

(52) U.S. Cl.
CPC ............... *C13K 13/007* (2013.01); *C08H 6/00* (2013.01); *C08H 8/00* (2013.01); *C13K 1/02* (2013.01); *C13K 13/00* (2013.01); *D21C 11/0007* (2013.01)

(58) Field of Classification Search
CPC ........ C13K 13/007; C13K 13/00; C13K 1/02; D21C 11/0007; C08H 8/00; C08H 6/00
See application file for complete search history.

(56) References Cited

U.S. PATENT DOCUMENTS

| 4,102,705 | A | 7/1978 | Pfeiffer et al. |
|---|---|---|---|
| 4,278,471 | A | 7/1981 | Whittingham |
| 4,608,245 | A | 8/1986 | Gaddy et al. |
| 4,806,681 | A | 2/1989 | Hajek et al. |
| 5,264,623 | A | 11/1993 | Oehr et al. |

(Continued)

FOREIGN PATENT DOCUMENTS

| GB | 2145090 | 3/1985 |
|---|---|---|
| WO | 2009059228 A2 | 5/2009 |

OTHER PUBLICATIONS

Mao et al., Technical economic evaluation of a hardwood biorefinery using the "near-neutral" hemicellulose pre-extraction process, Jun. 2008, Journal of Biobased Materials and Bioenergy, vol. 2, No. 2, pp. 177-185.*

*Primary Examiner* — David C Mellon
(74) *Attorney, Agent, or Firm* — Hayes Soloway, PC

(57) ABSTRACT

A system and method for hardwood pulp liquid hydrolysate conditioning is provided. The system includes a first evaporator, a hydrolysis unit, at least one lignin separation device, a neutralization device, a precipitate removal device, a solvent extraction unit, a lignin removal and recovery unit, an acid and furfural separation and conditioning unit, and an electrodialysis device, which process a quantity of hardwood mix to produce a desalinated solution containing sugar.

13 Claims, 4 Drawing Sheets

(56) References Cited

U.S. PATENT DOCUMENTS

| | | | |
|---|---|---|---|
| 5,547,542 A * | 8/1996 | Landfors | 162/29 |
| 5,589,033 A | 12/1996 | Tikka et al. | |
| 5,628,830 A | 5/1997 | Brink | |
| 5,788,812 A | 8/1998 | Agar et al. | |
| 5,876,505 A | 3/1999 | Klyosov et al. | |
| 5,916,780 A | 6/1999 | Foody et al. | |
| 6,090,595 A | 7/2000 | Foody et al. | |
| 6,139,683 A | 10/2000 | Nimz et al. | |
| 7,399,855 B2 | 7/2008 | Frost | |
| 7,901,511 B2 | 3/2011 | Griffin et al. | |
| 2002/0102672 A1 | 8/2002 | Mizrahi et al. | |
| 2005/0203291 A1 | 9/2005 | Svenson et al. | |
| 2005/0272134 A1 | 12/2005 | Hughes | |
| 2007/0193706 A1 * | 8/2007 | Kirov et al. | 162/28 |
| 2007/0254348 A1 | 11/2007 | Retsina et al. | |
| 2008/0057555 A1 | 3/2008 | Nguyen | |
| 2008/0202504 A1 | 8/2008 | Hilst | |
| 2008/0293114 A1 | 11/2008 | Foody et al. | |
| 2009/0005532 A1 | 1/2009 | Frost | |
| 2009/0218055 A1 | 9/2009 | Uusitalo et al. | |
| 2009/0226979 A1 | 9/2009 | Retsina et al. | |
| 2010/0136634 A1 | 6/2010 | Kratochvil et al. | |
| 2010/0184151 A1 | 7/2010 | Tolan et al. | |
| 2010/0284900 A1 | 11/2010 | Chen | |
| 2010/0303989 A1 | 12/2010 | Brooks et al. | |
| 2010/0303990 A1 | 12/2010 | Brooks et al. | |
| 2011/0039318 A1 | 2/2011 | Lehr | |
| 2011/0097786 A1 | 4/2011 | Howard et al. | |
| 2011/0129886 A1 | 6/2011 | Howard et al. | |
| 2011/0143398 A1 | 6/2011 | Howard et al. | |

* cited by examiner

SYSTEM AND METHOD FOR CONDITIONING A HARDWOOD PULP LIQUID HYDROLYSATE

CROSS REFERENCE TO RELATED APPLICATION

This application claims benefit of U.S. Provisional Application Ser. No. 61/526,895, entitled, "System and Method for Conditioning a Hardwood Pulp Liquid Hydrolysate" filed Aug. 24, 2011, the entire disclosure of which is incorporated herein by reference.

FIELD OF THE DISCLOSURE

The present disclosure is generally related to wood-to-biofuel systems and processes and more particularly is related to a system and process for conditioning a hardwood pulp liquid hydrolysate.

BACKGROUND OF THE DISCLOSURE

The extraction of various substances, such as raw liquid extract, from a solid hardwood or hardwood pulp is a common and necessary process when making paper or other cellulose-based materials. Hardwood naturally contains substances useful for processing into bio-fuel and other organic products. However, while hardwood is regularly processed for making paper or other cellulose-based materials, it has never been efficiently processed into bio-fuel products with commercial success. Acetone, butanol, and ethanol, as an example, can be processed from hardwood extracts. However, to date, the processes developed have been too costly to pursue commercially. One of the process difficulties contributing to the lack of commercial success is the difficulty in separating lignin from hardwood extract in a commercially viable manner.

Thus, an unaddressed need exists in the industry to provide a system and method for conditioning raw wood extract to create products of interest such as sugars suitable for fermentation and organic acids.

SUMMARY OF THE DISCLOSURE

Embodiments of the present disclosure provide a system and method for hardwood pulp liquid hydrolysate conditioning. Briefly described, in architecture, one embodiment of the system, among others, can be implemented as follows. A hardwood pulp liquid hydrolysate conditioning system includes a first evaporator receiving a first extract derived from a quantity of hardwood mix and outputting a quantity of vapor and a quantity of second extract. A hydrolysis unit is positioned to receive the second extract and output a third extract. At least one lignin separation device is positioned to receive the third extract from the hydrolysis unit, wherein the lignin separation device separates and recovers a quantity of lignin. A neutralization device is positioned to receive a fourth extract from the at least one lignin separation device, the neutralization device having a neutralizing agent input, wherein the neutralization device neutralizes the quantity of extract, whereby a combination of the fourth extract and the neutralizing agent produces a mixture of solid precipitate and a fifth extract. A precipitate removal device is positioned to receive the mixture of solid precipitate and the fifth extract from the neutralization device and remove the solid precipitate from the fifth extract, wherein the fifth extract is output from the precipitate removal device. A solvent extraction unit receives the fifth extract, wherein a quantity of solvent within the solvent extraction unit removes a quantity of acid, a quantity of furfural and a quantity of lignin as solute rich sixth extract and an aqueous seventh extract, wherein a second of the plurality of processing columns separates at least a portion of the solvent from the sixth extract and wherein a third of the plurality of processing columns separates a portion of solvent from the aqueous seventh extract, wherein two separated portions of the solvents are combined and recycled to the extraction column. A lignin removal and recovery unit receives at least a portion of the solute rich sixth extract, having the quantity of acids, furfural and lignin, wherein a recycled quantity of furfural is mixed with the solute rich sixth extract to separate out the quantities of acid and furfural to produce an eighth extract, and separate out a second quantity of furfural to produce a ninth extract, wherein a caustic solution is mixed with the ninth extract to remove the quantity of lignin and a quantity of water from the quantity of furfural, wherein the furfural is recycled into the eighth extract. An acid and furfural separation and conditioning unit is positioned to receive the eighth extract and separate out quantities of formic acid, acetic acid and furfural. An electrodialysis device is positioned to receive at least a portion of the seventh extract, and a quantity of brine solution, wherein the electrodialysis device outputs the brine solution carrying acid, salt, heavy metal and lignin and desalinated solution containing sugar.

The present disclosure can also include a processing apparatus for conditioning hardwood pulp liquid hydrolysate. Briefly described, in architecture, one embodiment of the apparatus, among others, can be implemented as follows. An inlet feed supplies a quantity of concentrated hardwood pulp extract with solid precipitate removed. A solvent extraction unit receives at least a portion of the quantity of concentrated hardwood pulp extract with solid precipitate removed, wherein a quantity of solvent within the solvent extraction unit removes a quantity of acid, a quantity of furfural and a quantity of lignin from the quantity of concentrated hardwood pulp extract with solid precipitate removed to produce a solute rich solvent extract and an aqueous extract, wherein a quantity of solvent is removed from the solute rich extract and the aqueous extract. A lignin removal and recovery unit receives at least a portion of the solute rich extract having the quantity of acids, furfural, and lignin, wherein a quantity of furfural is mixed with the solute rich extract to separate out quantities of acid and furfural, and also separate out a quantity of furfural to produce at least two extracts, wherein a caustic solution is mixed with a first extract of the at least two extracts to remove the quantity of lignin and a quantity of water from the quantity of furfural, wherein the furfural is recycled to the lignin removal and recovery unit. An acid and furfural separation and conditioning unit receives the second extract and separating out quantities of formic acid, acetic acid and furfural.

The present disclosure can also be viewed as providing methods for hardwood pulp liquid hydrolysate conditioning. In this regard, one embodiment of such a method, among others, can be broadly summarized by the following steps: receiving a first extract derived from a quantity of hardwood mix into a first evaporator and outputting a quantity of vapor and a second extract; hydrolyzing the second extract and outputting a third extract; separating and recovering a quantity of lignin from the third extract and outputting a resulting fourth extract; neutralizing the fourth extract, thereby forming a quantity of solid precipitate and fifth extract; separating the quantity of solid precipitate from the fifth extract; combining the fifth extract with a quantity of solvent thereby removing a quantity of acid, a quantity of furfural and a quantity of lignin from the fifth extract to produce a solute rich solvent sixth extract and an aqueous seventh extract, whereby the quantity of solvent is removed from the solute rich sixth extract and the aqueous seventh extract and recycled to a first extraction column; mixing the solute rich sixth extract having the quantity of acids, furfural and lignin with a quantity of recycled furfural thereby separating out the quantities of acid and furfural to produce an eighth extract, and separating out the quantity of furfural to produce a ninth extract; mixing a caustic solution with the ninth extract to remove the quantity of lignin and a quantity of water from the quantity of furfural, wherein the furfural is recycled into the eighth extract; inputting the aqueous seventh extract and a brine solution to an electrodialysis device and outputting a liquid containing acid, salt, heavy metal, and lignin and a desalinated solution containing sugar from the seventh extract; and separating out quantities of formic acid, acetic acid and furfural from the eighth extract.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
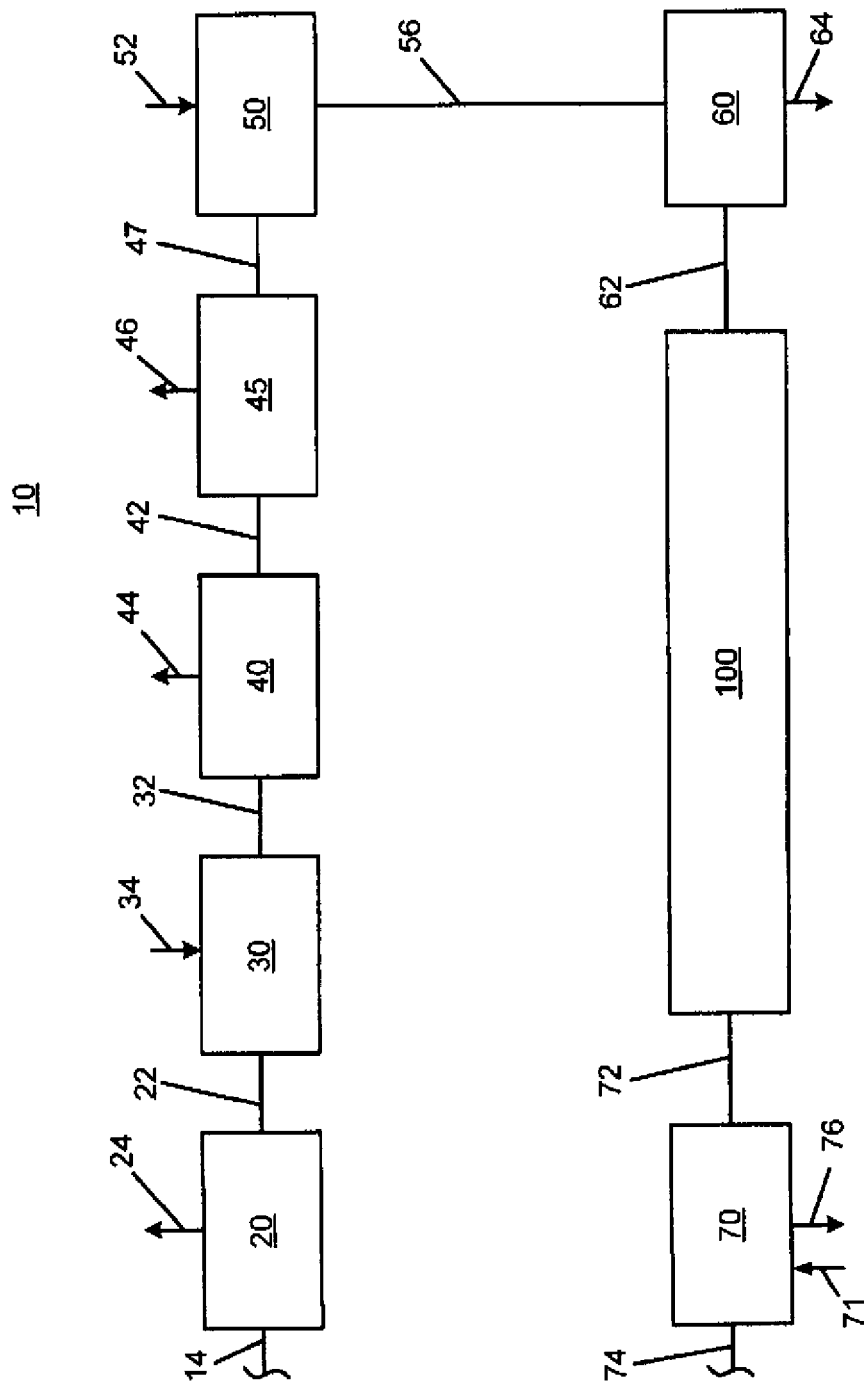
FIG. 1 is a schematic illustration of a hardwood pulp liquid hydrolysate conditioning system, in accordance with a first exemplary embodiment of the present disclosure.

FIG. 1 is a schematic illustration of a hardwood pulp liquid hydrolysate conditioning system 10, in accordance with a first exemplary embodiment of the present disclosure. The hardwood pulp liquid hydrolysate conditioning system 10, hereinafter simply referred to as the 'system' 10, may be used to extract a liquid solution from a hardwood substance, such as a solid hardwood mix. The system 10 may include a series of devices used to process hardwood mix to carry out the conditioning of the liquid solution. As will be discussed herein, the system 10 may include various stages throughout the process, which are described generally as sub-processes and/or steps for clarity in disclosure. Generally, the processes, sub-processes and steps may produce, separate, and/or remove volatile organic acids, such as acetic and formic acids and monomeric sugar solutions. Many of these volatile organic acids may be suitable for further processing to various qualities and concentrations of commercial products. Monomeric sugar solutions may be suitable for fermentation or chemical alteration to other organic compounds.

The system 10 includes devices, systems, and components that are arranged in specific and unique sequences, as discussed herein. Accordingly, although variations within the system 10 may exist, optimal technical and economic viability of the system 10 may be achieved when the system 10 is operated in accordance to the conditions disclosed herein. Additionally, some of the devices are configured to operate at predetermined conditions, including predetermined temperatures and pH levels and solution concentrations for predetermined periods of time. Variations in the levels and/or ranges of operating temperatures, pH levels, and solution concentrations, as well as various lengths of time disclosed herein may include modifications and variations, all of which are considered within the scope of the present disclosure.

As is shown in FIG. 1, the system 10 includes a first evaporator 20 receiving a first extract derived from a quantity of hardwood mix through a first input conduit 14. The first evaporator 20 may be operated between a pH 6 and 8 with a concentration factor of 4×-8×. The evaporation may help in reducing a downstream hydraulic load to approximately 10%-25% of the feed volume with minimal release of acid into the vapor phase. This may significantly reduce the size of units downstream of the first evaporator 20, thereby resulting in a lower capital expense and lower operating costs of the system 10. The system 10 may allow for the utilization of sensible energy from the extract solution, which may provide a high fraction of the heat of vaporization required to evaporate the solution in order to minimize steam demand. Accordingly, the first evaporator 20 may receive the first extract derived from a quantity of hardwood mix chips and may output a quantity of vapor comprised of at least 90% water (for some applications, at least 99% water) and the balance acids, along a first diverging conduit 24. The vapor may be utilized for other purposes, including the heat therein, or may be otherwise disposed. The first evaporator 20 may also output a quantity of a second extract through a first conduit 22 to a hydrolysis device 30, although the second extract could be otherwise transported and the first evaporator 20 and the hydrolysis device 30 may be located on separate and remote sites.

The hydrolysis device 30 may receive the second extract from the first evaporator 20 through the first conduit 22, and may output a third extract through a second conduit 32. The hydrolysis device 30 may receive mineral acid, such as sulfuric or hydrochloric acid, through an acid input conduit 34. The hydrolysis device 30 may strip sugars that are attached to lignin within the second extract and hydrolyze any oligomers into monomeric sugars. The hydrolysis device 30 may be operated for approximately sixty minutes between an approximate pH of 0 and 2, utilizing mineral acid, and between an approximate temperature of 100° C. and 120° C. The heat of dilution of the addition of mineral acid may be utilized to raise the temperature of the extract to match a temperature required for hydrolysis. The hydrolysis may precipitate a high fraction of the dissolved lignin in the third extract, which may be output along with everything else including sugars through the second conduit 32 to a lignin separation device 40. The second conduit 32 may be valved to allow the hydrolysis device 30 to operate at a higher pressure than the lignin separation device 40, which operates at a lower pressure than the hydrolysis device 30.

The lignin separation device 40 may be located proximate to the hydrolysis device 30 and receive the third extract from the hydrolysis device 30 through the second conduit 32. It is important to separate precipitated lignin from the extract solution because high concentrations of lignin can inhibit the fermentation process for which the monomeric sugars may be used. The lignin separation device 40 may include a chiller, which may simply cool the third extract to a temperature below its previously heated temperature. The lignin separation device 40 may lower the temperature of the third extract such that lignin precipitates. The lignin may precipitate naturally or more easily at the cooled temperature. The precipitated lignin may collect in a lower portion of the lignin separation device 40 and require running a caustic solution, such as black liquor, through the lignin separation device 40 to dissolve, recover and remove the deposited lignin through conduit 44, which may then be utilized for other purposes or otherwise disposed.

The lignin separation device 40 may feed to a chiller 45 through a third conduit 42. The chiller 45 may further cool the third extract and precipitate some salts, such as sodium sulfate. For example, the chiller 45 may operate at a lower temperature than the lignin separation device 40. A fourth extract may be output from the chiller 45 through a fourth conduit 47. The chiller 45 may precipitate salt, which may collect in a lower portion of the chiller 45 and outputted as a slurry through conduit 46 to a salt recovery process or be otherwise disposed.

A neutralization device 50 may be included in the system 10, positioned proximately to the chiller 45, as is shown in FIG. 1, to receive the fourth extract through the fourth conduit 47. The neutralization device 50 may receive the fourth extract from the chiller 45 and may neutralize it to a pH value suitable for downstream materials of construction and operation as well as to improve acid recovery in a subsequent process. The neutralization may be done with a neutralizing agent input containing a neutralizing agent, such as lime or Ca(OH)2, which is input through a second input conduit 52 and added in the neutralization device 50. When the neutralizing agent, such as calcium oxide and/or calcium hydroxide, is added to the fourth extract, the pH level of the now fifth extract may be raised to between 2 and 5, which may result in the formation of a quantity of solid precipitate. Optionally, more solid precipitate can be gained and more SO4 can be removed from the acid if a slurry of calcium hydroxide is added. The fifth extract and the quantity of solid precipitate is output from the neutralization device 50 through a fifth conduit 56 to a precipitate removal device 60.

The precipitate removal device 60 may receive the fifth extract from the neutralization device 50 with the quantity of precipitate formed in the neutralization device 50. The precipitate removal device 60 may include a variety of devices, such as a solid/liquid continuous separating unit, which removes the solid precipitate from the fifth extract via conduit 64. The solid precipitate may be comprised of Gypsum CaSO4. A variety of devices, such as a filter press, belt press or a bowl centrifuge may be used as precipitate removal device 60. After removing the solid precipitate from the fifth extract through a fourth diverging conduit 64, the precipitate removal device 60 may output the fifth extract, as a quantity of concentrated extract with solid precipitate removed, through a sixth conduit 62.

Figure 2:
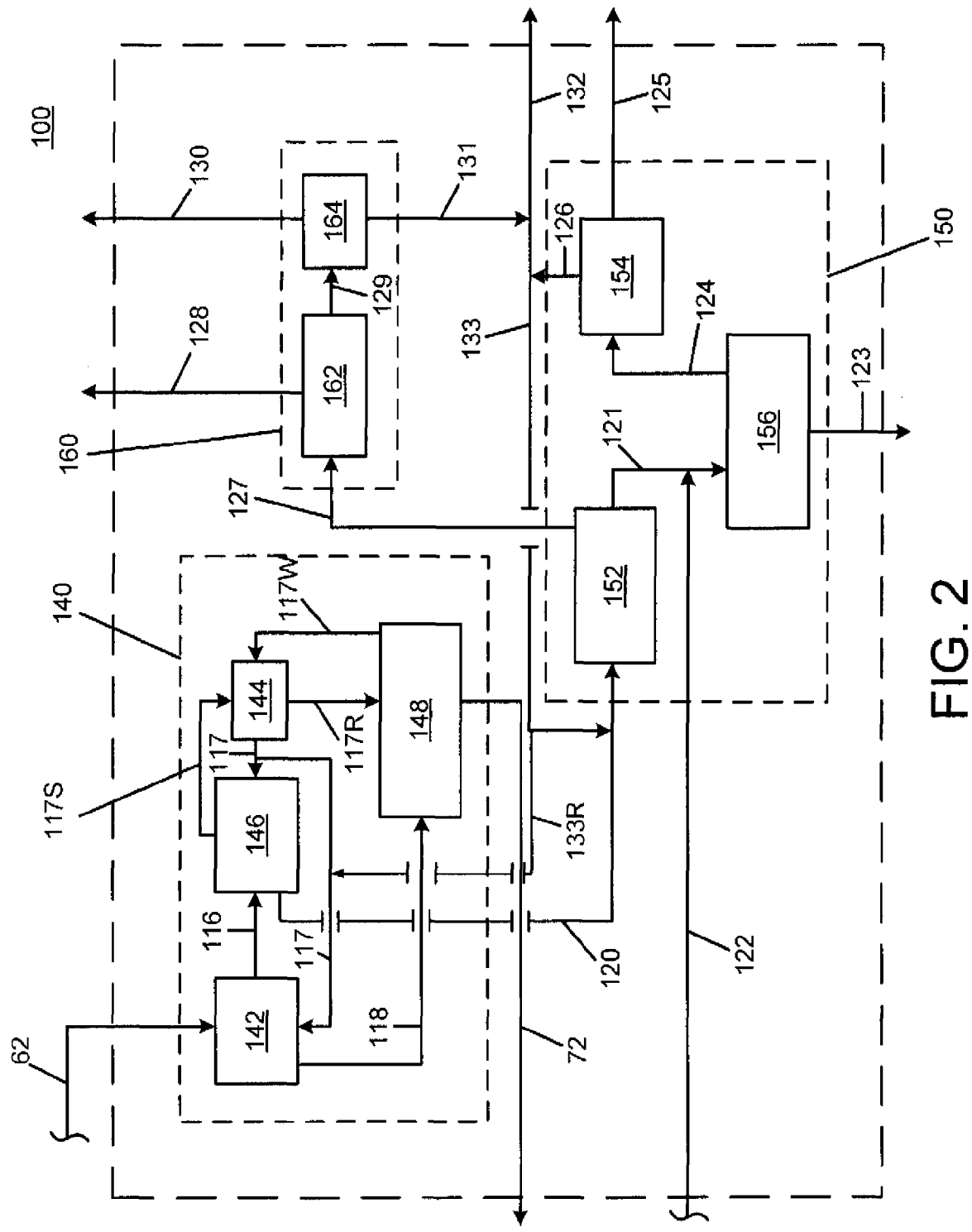
FIG. 2 is a schematic illustration of the processing unit of the hardwood raw liquid extraction system, in accordance with a first exemplary embodiment of the present disclosure.

The fifth extract is transported through the sixth conduit 62 to an acid, furfural, and lignin processing unit 100, hereinafter referred to as 'processing unit 100.' The processing unit 100 processes the fifth extract in various ways and may ultimately remove all or a substantial portion of the acids, furfural, and/or lignin within the fifth extract. A variety of extracts, solvents, and substances may be output from the processing unit 100, generally referred to herein as a 'processing unit 100 extract.' For example, the processing unit 100 may process the fifth extract, or a derivative extraction or solution thereof, to extract the various acids, furfural and lignin, strip any solvents, remove and recover lignin, and separate and condition acids and furfural. FIG. 2 illustrates the processing unit 100 in detail. An electrodialysis device 70 may be located before an output 74 of the system 10, and may receive the processing unit 100 extract from the processing unit 100 through the seventh conduit 72. The electrodialysis device 70 may reduce the salts, heavy metals, lignin, and/or residual acid within the extract to further polish and refine the processing unit 100 extract. The electrodialysis device 70 may assist with reducing acid concentration that has not been removed in the processing unit 100. A quantity of brine may be injected into the electrodialysis device 70 via conduit 71. The quantity of brine may generally consist of an aqueous solution containing salt such as sodium sulfate. The acids, salts, heavy metals and lignin are removed from unit 100 extract, and are transferred to this solution by the electrodialysis device and are removed from the unit with this solution thru conduit 76. A product of conditioned sugar solution leaves the system 10 through output 74.

FIG. 2 is a schematic illustration of the processing unit 100 of the hardwood raw liquid extraction system 10, in accordance with a first exemplary embodiment of the present disclosure. The processing unit 100 may include a variety of components and/or sub-systems, any of which may be configured to be remote or close to other components or sub-systems. For the sake of clarity, the processing unit 100 may include three exemplary sub-systems: an extraction unit 140, a lignin removal and recovery unit 150, and an acid and furfural separation and conditioning unit 160. Each of these three sub-systems is illustrated generally with broken lines in FIG. 2, but any of the features or components described and illustrated with respect to one of the sub-systems may be included within a different sub-system, all variations of which are considered within the scope of the present disclosure. Furthermore, the various components within the processing unit 100 are connected with a plurality of conduits, each referred herein as 'conduit' and numerically referenced for clarity. The conduit may include any type of fluid or non-fluid transporting structure, including any type of pipe, material supply line, or other material transportation structures.

The extraction unit 140 receives the fifth extract from the precipitate removal device 60 (FIG. 1) via sixth conduit 62. The fifth extract, which may be referred to as a 'conditioned extract,' is transported into a first liquid/liquid extraction column 142, hereinafter referred to as the 'first column 142.' The first column 142 may include a quantity of solvent, such as furfural, ethyl acetate, methyl acetate and/or ethyl formate, or another type of solvent. Some or all of this quantity of solvent may be input into the first column 142 via conduit 117, which is connected to a first separating vessel 144, discussed later. The solvent or solvents contained within the first column 142 may absorb any portion of acetic, formic and/or lactic acid within the fifth extract. Additionally, the solvent may absorb furfural and lignin within the fifth extract and some water.

The mixture of solvents and the fifth extract, including any acids, lignin, furfural and water may be known as a 'solute rich solvent' at this point, and is next transported to a second distillation column 146, hereinafter referred to as 'second column 146' via conduit 116. The second column 146 may be referred to as a solvent stripping column, since in the second column 146, the solvent and at least some of the water within the solute rich solvent is separated from the acids, furfural and lignin. This allows for solvent recovery and dehydration of organic phase, which may be accomplished through distillation. The separated acids, furfural and lignin, extract six, are transported to the lignin removal and recovery unit 150 via conduit 120 and the separated solvent stream with water is transported to the first separating vessel 144 via conduit 117S.

Also output from the first column 142 is an aqueous stream, which is transported to a third distillation column 148, hereinafter referred to as the 'third column 148' via conduit 118. This aqueous stream may be referred to as raffinate, and may contain salts, sugars and some solvent, and thus, the third column 148 may also be considered a raffinate stripping column. In the third column 148, solvent and some water may be removed from the aqueous stream and transported to the first separating vessel 144 via conduit 117W. The first separating vessel 144 may separate the solvent with two phases. One of the phases is the organic phase, where the quantity of solvent is drawn off and recycled back to the first column 142 via conduit 117. This recycled solvent may be used again in the first column 142 and again as reflux in the second column 146. The other phase, the aqueous phase, is recycled to the third column 148 via conduit 117R. The combination of the second and third columns 146, 148, and the first separating vessel 144 may act as an azotropic distillation system, which removes water from the solvent allowing it to act more effectively in the first column 142 and the extraction process. Make-up solvent is added to conduit 117 from conduit 133R. If furfural is used as solvent it is drawn from conduit 133.

The remainder of the aqueous stream from the third column 148 is transported via the seventh conduit 72 to the electrodialysis unit 70. This remainder of the aqueous stream transported via the seventh conduit 72 is the processing unit 100 extract, or seventh extract, discussed previously, and may contain sugar and salt, among other substances, which is further processed in the electrodialysis unit 70.

The separated acids, furfural and lignin, which constitute extract six, are transported to the lignin removal and recovery unit 150 via conduit 120, as is shown in FIG. 2. The lignin removal and recovery unit 150 receives these removed quantities of acid, furfural and lignin from the extraction unit 140 and processes them to produce an eighth extract, which is eventually transported to the acid and furfural separation and conditioning unit 160 via conduit 127. The lignin removal and recovery unit 150 includes at least a first distillation column 152 and a second distillation column 154, with a second separating vessel 156 connected between. In addition to outputting the eighth extract to the acid and furfural separation and conditioning unit 160 via conduit 127, the lignin removal and recovery unit 150 may output other substances, including water and lignin rich black liquor, as is further described herein.

The lignin removal and recovery unit 150 may use the addition of recycled furfural or another solvent to ensure that the lignin is sufficiently fluid to process within the lignin removal and recovery unit 150. In other words, the mixture or solution within the lignin removal and recovery unit 150 must be sufficiently fluid in order to pass through a distillation column and further processes the acids, furfural and lignin contained therein. To accomplish this, a quantity of recycled furfural is mixed with the separated acids, furfural and lignin in conduit 120. The recycled furfural may come from the second distillation column 154 via conduit 126. As is shown, conduit 126 is connected to conduit 133, which is connected to conduit 120, thus allowing the recycled furfural to mix in conduit 120. Of course, other materials may also be used in combination with the recycled furfural or in place of the recycled furfural. For example, organic liquids with boiling points above 150° C., preferably between 150° C. and 180° C., and low water solubility, such as kerosene, may be used.

After mixing with the recycled furfural via conduit 133, the solution from conduit 120 is fed into the first distillation column 152, where the acids and some furfural are separated by distillation from the lignin and furfural solution. The stream of acids and furfural, referred to as an eighth extract, are transported via conduit 127 to the acid and furfural separation and conditioning unit 160 and the lignin furfural solution is transported via conduit 121 to the second separating vessel 156. Lignin is very soluble in caustic solutions, so the lignin and furfural solution in conduit 121 is mixed with a caustic solution via conduit 122. Preferably, this caustic solution is in the form of black liquor from a pulp mill, but it may also be a white liquor or other caustic material, or known lignin solvent.

Once in the second separating vessel 156, furfural and dissolved water solution is separated from the combined lignin furfural and caustic solution and transported to the second distillation column 154 via conduit 124. In the second distillation column 154, the water and furfural may be separated, with the water exiting the lignin removal and recovery unit 150 via conduit 125 and the furfural being recycled back to conduit 120 via conduit 126 and conduit 133, as previously discussed. Of course, furfural may be diverted to the acid and furfural recovery unit 160 from the lignin removal and recovery unit 150 if it is not needed to be combined with conduit 120, or it may be recycled as solvent make-up to absorption column 142 through conduit 117. The combined lignin furfural and caustic solution within the second separating vessel 156 may also result in a lignin rich black liquor, which may be output from the second separating vessel 156 via conduit 123. Conduit 123 may transport this lignin rich black liquor to a recovery plant, a disposal unit, or another device.

The acid and furfural separation and conditioning unit 160 receives the eighth extract from the lignin removal and recovery unit 150 via conduit 127, and separates quantities of acetic acid, formic acid and furfural contained in the eighth extract. The acid and furfural separation and conditioning unit 160 includes a formic acid distillation column 162 connected to an acetic acid distillation column 164. Conduit 127 may lead to the formic acid distillation column 162 where the formic acid within the eighth extract is separated by distillation and removed via conduit 128. Conduit 128 may transport the formic acid out of the processing unit 100 for sale or another use. The remaining acetic acid and furfural within the eighth extract is transported to the acetic acid distillation column 164 via conduit 129. Here, the acetic acid is separated from the furfural and removed via conduit 130 for sale or other use. The furfural is output from the acetic acid distillation column 164 via conduit 131, where it is either transported to be used for a product via conduit 132, or recycled back into the lignin removal and recovery unit 150 via conduit 133, or recycle to absorption column 142 by conduits 133R and 117.

As discussed relative to FIG. 1, the seventh extract, or processing unit 100 extract, is transported from the processing unit 100 to the electrodialysis device 70. A quantity of brine may also be input in to the electrodialysis device 70 via conduit 71, where the brine may reduce the salts, heavy metals, lignin, and/or residual acid within the extract by transferring some of these materials to the brine, to further polish and refine the processing unit 100 extract. The electrodialysis device 70 may output the quantities of acid, heavy metal, lignin, and salts with the brine through conduit 76, which may be discarded or fed to a salt recovery device. The output 74 may output a desalinated solution that is sugar rich, which can be sent to a fermentation device or used in various industrial and commercial processes.

Figure 3A:
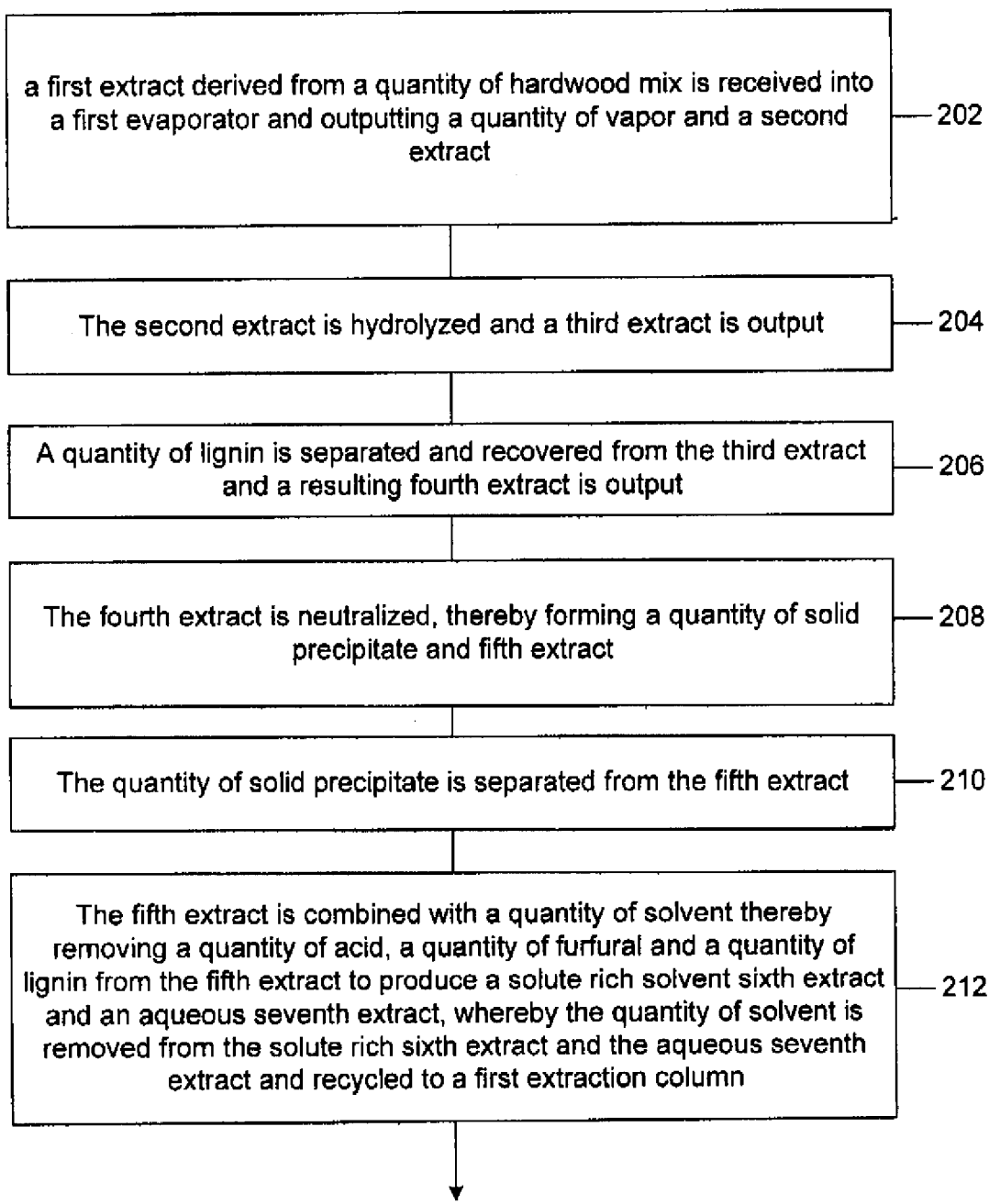
FIGS. 3A & 3B are a flowchart illustrating a hardwood raw liquid extraction, in accordance with the first exemplary embodiment of the present disclosure.
Figure 3B:
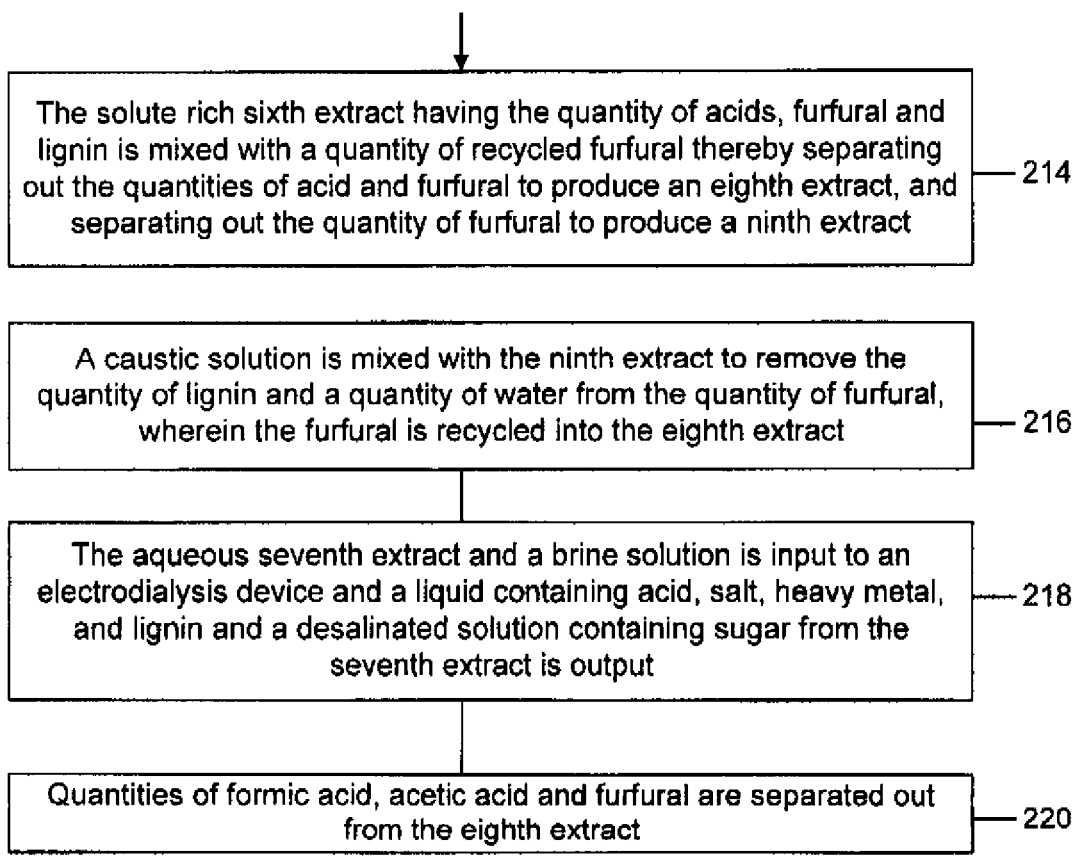

FIGS. 3A & 3B are a flowchart 200 illustrating a hardwood raw liquid extraction process, in accordance with the first exemplary embodiment of the present disclosure. It should be noted that any process descriptions or blocks in flow charts should be understood as representing modules, segments, or steps that include one or more instructions for implementing specific operations in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 202, a first extract derived from a quantity of hardwood mix is received into a first evaporator and outputting a quantity of vapor and a second extract. The second extract is hydrolyzed and a third extract is output (block 204). A quantity of lignin is separated and recovered from the third extract and a resulting fourth extract is output (block 206). The fourth extract is neutralized, thereby forming a quantity of solid precipitate and fifth extract (block 208). The quantity of solid precipitate is separated from the fifth extract (block 210). The fifth extract is combined with a quantity of solvent thereby removing a quantity of acid, a quantity of furfural and a quantity of lignin from the fifth extract to produce a solute rich solvent sixth extract and an aqueous seventh extract, whereby the quantity of solvent is removed from the solute rich sixth extract and the aqueous seventh extract and recycled to a first extraction column (block 212). The solute rich sixth extract having the quantity of acids, furfural and lignin is mixed with a quantity of recycled furfural thereby separating out the quantities of acid and furfural to produce an eighth extract, and separating out the quantity of furfural to produce a ninth extract (block 214). A caustic solution is mixed with the ninth extract to remove the quantity of lignin and a quantity of water from the quantity of furfural, wherein the furfural is recycled into the eighth extract (block 216). The aqueous seventh extract and a brine solution is input to an electrodialysis device and a liquid containing acid, salt, heavy metal, and lignin and a desalinated solution containing sugar from the seventh extract is output (block 218). Quantities of formic acid, acetic acid and furfural are separated out from the eighth extract (block 220).

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

What is claimed is:

1. A hardwood pulp liquid hydrolysate conditioning system comprising:
    a first evaporator receiving a first extract derived from a quantity of hardwood mix and outputting a quantity of vapor and a quantity of second extract;
    a hydrolysis unit positioned to receive the second extract and output a third extract;
    at least one lignin separation device positioned to receive the third extract from the hydrolysis unit, wherein the lignin separation device separates and recovers a quantity of lignin;
    a neutralization device positioned to receive a fourth extract from the at least one lignin separation device, the neutralization device having a neutralizing agent input, wherein the neutralization device neutralizes the quantity of extract, whereby a combination of the fourth extract and the neutralizing agent produces a mixture of solid precipitate and a fifth extract;
    a precipitate removal device positioned to receive the mixture of solid precipitate and the fifth extract from the neutralization device and remove the solid precipitate from the fifth extract, wherein the fifth extract is output from the precipitate removal device;
    a solvent extraction unit receiving the fifth extract, wherein a quantity of solvent within the solvent extraction unit removes a quantity of acid, a quantity of furfural and a quantity of lignin as solvent rich sixth extract and an aqueous seventh extract, wherein a plurality of processing columns separates at least a portion of the solvent from the sixth extract and separates a portion of solvent from the aqueous seventh extract, wherein two separated portions of the solvents are combined and recycled to the extraction column;
    a lignin removal and recovery unit receiving at least a portion of the solute rich sixth extract, having the quantity of acids, furfural and lignin, wherein a recycled quantity of furfural is mixed with the solute rich sixth extract to separate out the quantities of acids and furfural to produce an eighth extract, and separate out a second quantity of furfural and lignin to produce a ninth extract, wherein a caustic solution is mixed with the ninth extract to remove the quantity of lignin and a quantity of water from the quantity of furfural, wherein the furfural is recycled into the eighth extract;
    an acid and furfural separation and conditioning unit positioned to receive the eighth extract and separate out quantities of formic acid, acetic acid and furfural; and
    an electrodialysis device positioned to receive at least a portion of the seventh extract, and a quantity of brine solution, wherein the electrodialysis device outputs:
        the brine solution carrying acid, salt, heavy metal and lignin; and
        a desalinated solution containing sugar.

2. The hardwood pulp liquid hydrolysate conditioning system of claim 1, wherein the first evaporator operates between a pH of 6 and 8 with a concentration factor of 4×-8×.

3. The hardwood pulp liquid hydrolysate conditioning system of claim 1, wherein the hydrolysis unit strips a quantity of sugars attached to a quantity of lignin within the second extract.

4. The hardwood pulp liquid hydrolysate conditioning system of claim 1, wherein the hydrolysis unit hydrolyzes a quantity of oligomers within the second extract into monomeric sugars.

5. The hardwood pulp liquid hydrolysate conditioning system of claim 1, wherein the at least one lignin separation device further comprises a chiller to lower a temperature of the third extract.

6. The hardwood pulp liquid hydrolysate conditioning system of claim 1, further comprising a caustic solution within the lignin separation device, wherein the caustic solution at least partially separates and recovers the quantity of lignin.

7. The hardwood pulp liquid hydrolysate conditioning system of claim 1, wherein the neutralization device raises a pH level of the fifth extract to form of a quantity of solid precipitate.

8. The hardwood pulp liquid hydrolysate conditioning system of claim 1, wherein the neutralization device raises a pH level of the fifth extract to form of a quantity of solid precipitate by adding at least one of calcium oxide and calcium hydroxide to form a quantity of solid precipitate.

9. The hardwood pulp liquid hydrolysate conditioning system of claim 7, further comprising a conditioning unit positioned to separate the fifth extract from the quantity of solid precipitate.

10. The hardwood pulp liquid hydrolysate conditioning system of claim 1, wherein the solvent extraction unit has a plurality of processing columns, wherein a first of the plurality of processing columns combines a quantity of solvent with the fifth extract, and separates a solute rich, solvent rich sixth extract, containing quantities of acids, furfural, and lignin from an aqueous seventh extract containing salts some acids, heavy metals and sugar, wherein a second of the plurality of processing columns separates at least a portion of solvent from the sixth extract, and wherein a third of the plurality of processing columns separates at least a portion of portion of the solvent from the fifth extract, wherein the separated portions of the of solvents are recycled to the first column.

11. The hardwood pulp liquid hydrolysate conditioning system of claim 1, wherein the lignin removal and recovery unit further comprises at least a first distillation column and a second distillation column, wherein a separating vessel is connected between the first and second distillation columns.

12. The hardwood pulp liquid hydrolysate conditioning system of claim 1, wherein the lignin removal and recovery unit further comprises a solvent recycle system, wherein the solvent recycle system transports a quantity of recycled solvent to at least one distillation column within the lignin removal and recovery unit.

13. The hardwood pulp liquid hydrolysate conditioning system of claim 1, wherein the acid and furfural separation and conditioning unit further comprises at least a formic acid distillation column and an acetic acid distillation column.

* * * * *